Dec. 20, 1966    O. O. McMASTERS ET AL    3,292,948
MOBILE IMPLEMENT HITCH
Filed June 28, 1965    3 Sheets-Sheet 1
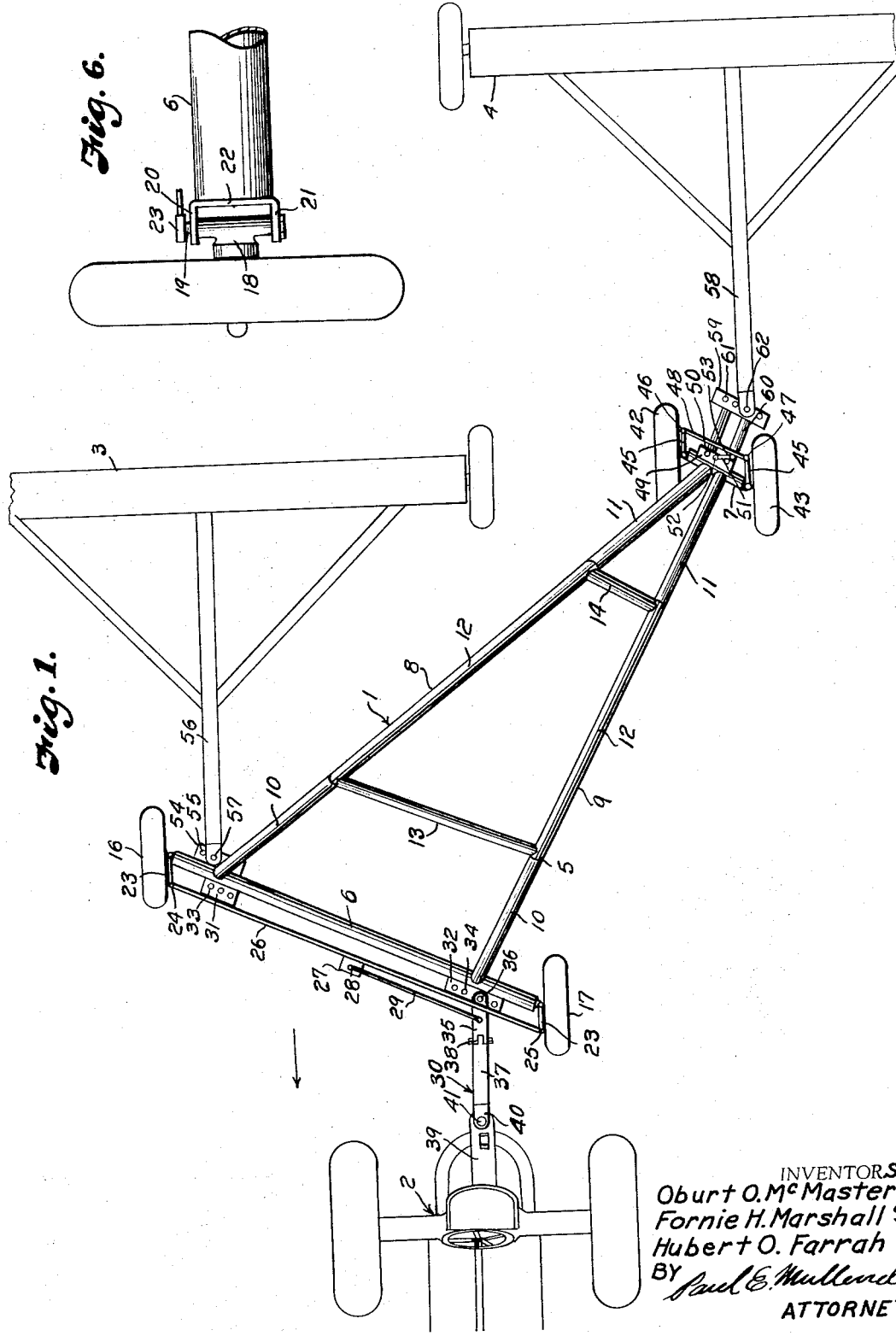
INVENTORS
Oburt O. McMasters,
Fornie H. Marshall and
Hubert O. Farrah
BY
ATTORNEY

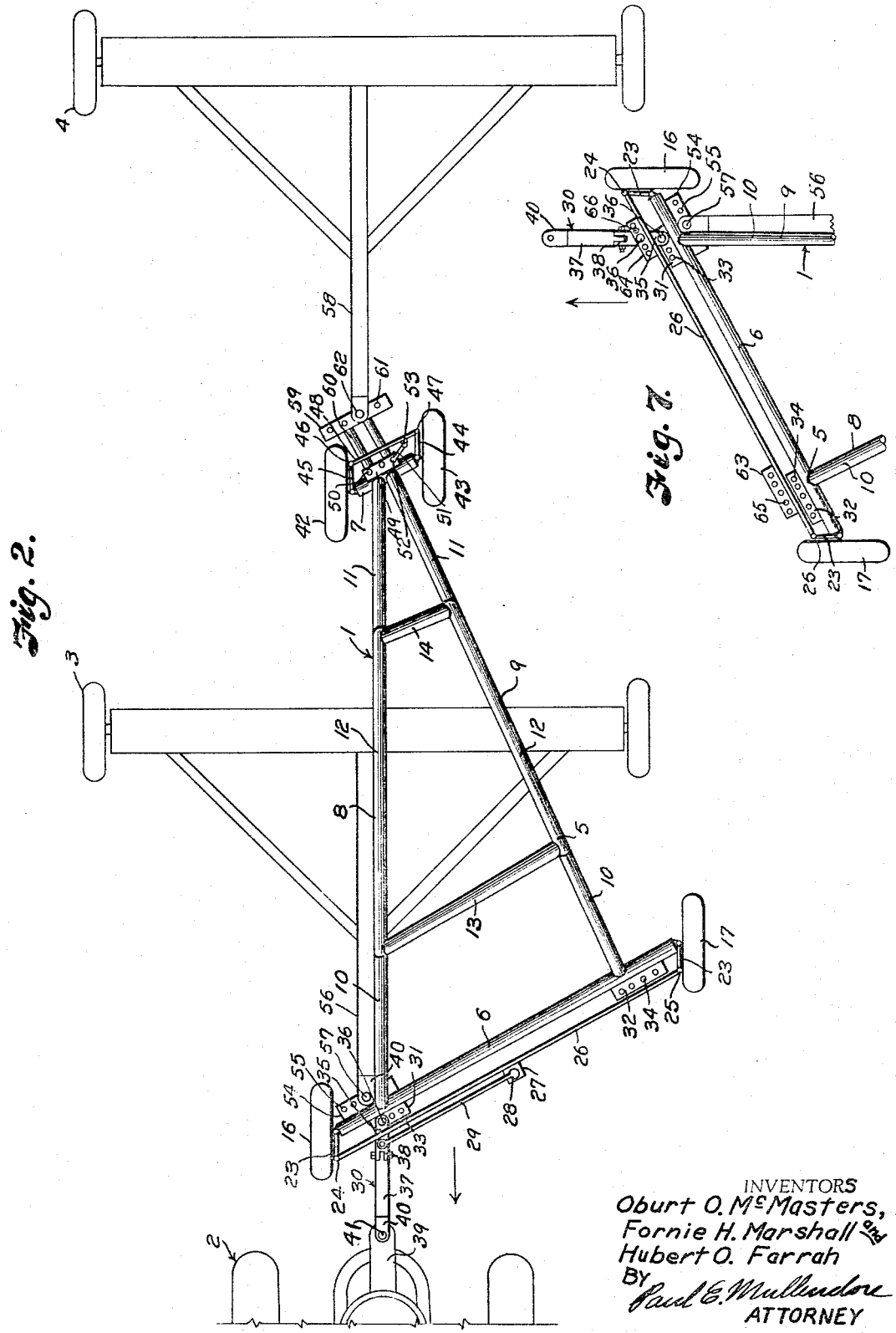

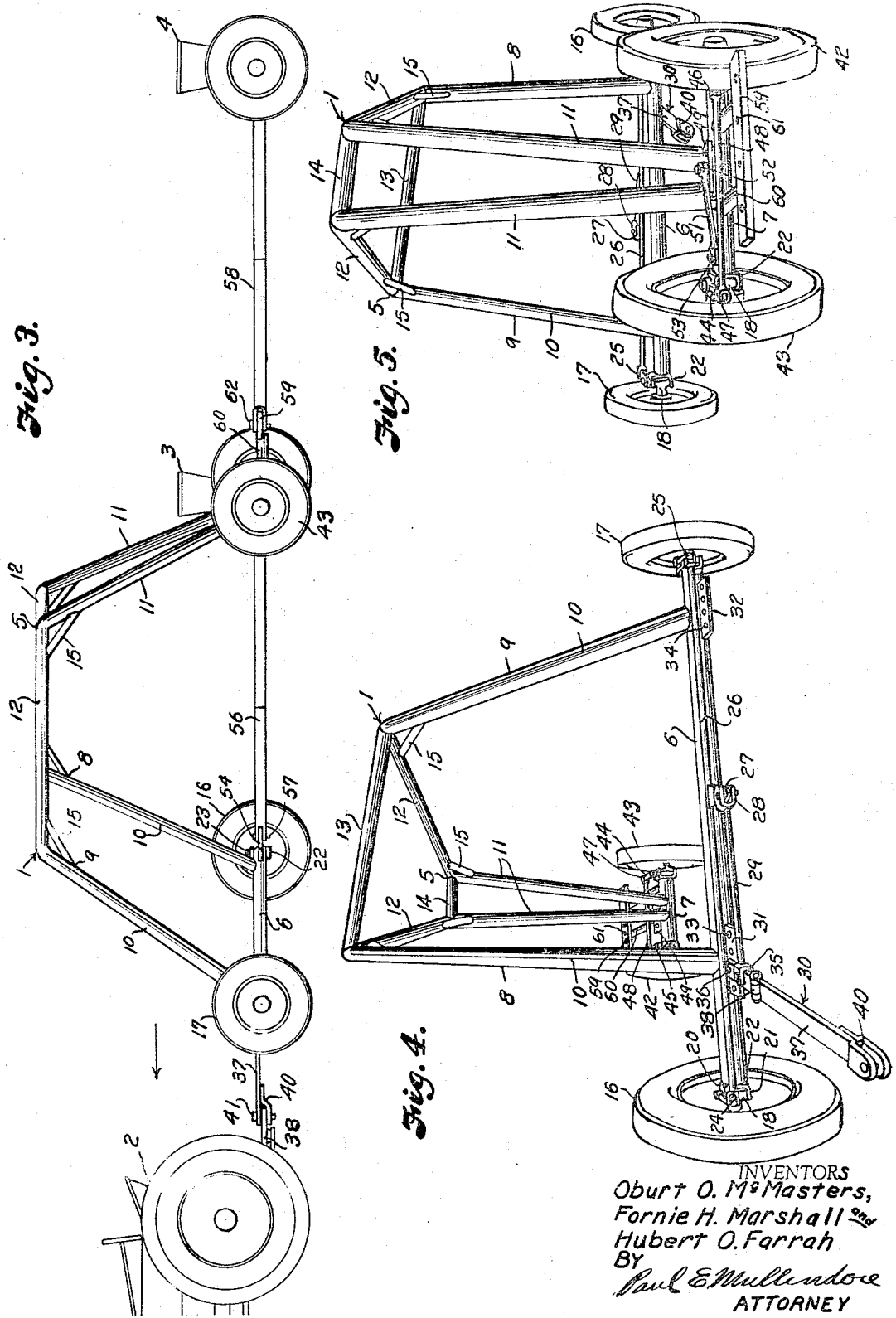

United States Patent Office 3,292,948
Patented Dec. 20, 1966

3,292,948
MOBILE IMPLEMENT HITCH
Oburt O. McMasters, Fornie H. Marshall, and Hubert O. Farrah, all of Braman, Okla. 74632
Filed June 28, 1965, Ser. No. 467,327
12 Claims. (Cl. 280—412)

This invention relates to a mobile hitch for connection with the drawbar of a tractor vehicle for towing a plurality of grain drills, movers, harrows, or tillage and harvesting implements in trailing, laterally staggered relation when working in a field, and in tandem when the implements are to be towed through a gate or along a highway for transportation from one field to another.

For example, tractors have now become the motive power used in modern farming for pulling the implements necessary in preparing the seed bed, planting the seed, and in cultivating and harvesting crops. Since the power of the usual tractor is greatly in excess of that required to pull a single implement, it is the present practice to hitch two or more implements to the drawbar of a single tractor for working a greater area and to premit of larger operations. Various schemes have been devised for hitching a plurality of implements to a tractor. Usually such hitches are quite complicated and are difficult to adjust for distributing the draft when switching from one type of implement to another. Also, the implements do not follow the tractor without producing side drafts that expend power of the tractor in nonuseful work. It is also necessary to rearrange the parts of the hitch when the implements are to be pulled in tandem.

For the above reasons, various types of mobile hitches have been devised, but they all require considerable re-arrangement of the wheels thereof and modification of other major component parts of the hitch, such as un-bolting, rehinging various parts of the frame, and rebolt-ing thereof in order that the hitch is no wider than the tow. Even then, the implements require disconnection and reconnection to other parts of the hitch when changing from one field to another. Also, in some instances the mobile hitch, after changing to road travel, is considerably wider than the implements pulled thereby, so that the total width is in excess of the width allowed by law.

It is, therefore, the principal object of the present invention to provide a mobile hitch that overcomes the above mentioned difficulties, and particularly those which require major adjustments and relocating various sections of the frame when changing from field operation to highway use and back again to field operation.

Other objects of the invention are to provide a mobile hitch that is of lighter draft, simpler in construction, and less expensive than present mobile hitches with which we are familiar.

In accomplishing these objects, the mobile hitch of the present invention includes a triangular frame having a front axle for hitching the leading implement thereto, and which axle is supported by dirigible wheels steered by a connection with the draftbar of the hitch. The triangular frame also has a relatively shorter wheel-supported rear axle and arches connecting the front and rear axles, and to which the following implement is connected, the preferred forms of which are illustrated in the accompanying drawings, wherein:

FIG. 1 is a plan view of a mobile hitch constructed in accordance with the preferred embodiment of the invention, and showing the connection thereof with the drawbar of a tractor, with implements connected thereto in staggered, lateral alignment with each other, as when operating in a field.

FIG. 2 is a similar plan view of the mobile hitch, showing both implements in tandem, as when the mobile hitch and the implements are pulled along a highway as when moving from one field of operation to another.

FIG. 3 is a longitudinal side view of the mobile hitch and implements in field position as shown in FIG. 1.

FIG. 4 is a front perspective view, to give a better understanding of the construction of the mobile hitch, the implements and tractor having been disconnected therefrom.

FIG. 5 is a perspective rear view of the mobile hitch.

FIG. 6 is an enlarged, fragmentary view showing the dirigible mounting of one of the front wheels on the front axle.

FIG. 7 is a partial plan view of a hitch, showing a modified form of steering connection between the front wheels and the drawbar.

Referring more in detail to the drawings:

1 designates a mobile hitch constructed in accordance with the present invention, 2 a tractor for pulling the hitch, and 3 and 4 implements towed by the hitch.

The mobile hitch 1 includes a frame 5 which is of generally triangular shape in plan and forms an upwardly extending arch in side elevation. The major component parts of the frame may be formed of tubular material in order to provide a strong, lightweight construction and having an easy draft. The frame includes a front axle 6 at the base and a relatively shorter rear axle 7 at the apex of the triangle, with the sides formed by arches or trusses 8 and 9 that connect with the front axle near the ends and with the midpoint of the rear axle. The arches 8 and 9, except for length, follow the same construction, and include front legs 10 extending upwardly and rearwardly from their connection with the front axle and downwardly and rearwardly sloping rear legs 11 that connect with the rear axle 7, the front and rear legs being interconnected by horizontals 12, to give ample space thereunder for swinging the mobile hitch over the front implement without interference, as later to be described. The arches or trusses thus converge from the front axle to the midpoint of the rear axle, as best shown in FIGS. 1 and 2, and are interconnected adjacent the ends of the horizontals 12 by front and rear tie members 13 and 14. The parts of the trusses and their connections with the axles are preferably made by welding, so as to provide a substantially unitary frame. The junctures of the legs 10–11 with the horizontals 12 of the frame are preferably reinforced by angular braces 15 (FIGS. 3, 4 and 5). The front and rear axles, as well as the cross members 13 and 14, are substantially parallel, as shown in FIGS. 1 and 2. Carrying the respective ends of the front axle 6 are dirigible wheels 16 and 17 that are rotatably mounted on the axles of steering knuckles 18 which are fixed to king pins 19 journaled in arms 20 and 21 of yokes 22 being fixed to the ends of the axle, preferably by welding. The king pins, as stated, are fixed to the steering knuckles and are journaled in the arms 20 and 21 of the yokes 22, so that the wheels may be steered by steering arms 23 fixed rigidly to the upper end of the king pins. The steering arms 23 are pivotally connected at their forward ends as at 24 and 25 with a tie rod 26 extending parallel with the front axle. Fixed to the midpoint of the tie rod is a forwardly extending arm 27 to which is pivotally connected, as at 28, one end of a drag link 29, the other end of the drag link being connected with the draftbar 30 of the mobile hitch in one and the other of two positions of the draftbar.

Fixed to the front axle substantially in line with the forward legs 10 of the respective arches 8 and 9 are horizontal plates 31 and 32, each having a series of openings 33 and 34, respectively, for selectively connecting the draftbar 30.

The draftbar 30 includes a part 35 that is pivotally connected with one or the other plates 31 and 32 by a coupling or pull pin 36. The other part of the draftbar comprises a forward extension 37 that is connected with the part 35 by a horizontal hinged joint 38, to accommodate the height of the drawbar 39 of the tractor 2. The forward end of the draftbar has a yoke 40 adapted to be connected pivotally with the drawbar 39 by a pull pin type coupling 41.

The rear axle 7 is carried on wheels 42 and 43 that are connected with the ends thereof in the same manner as described in connection with the front wheels and illustrated in FIG. 6, except the steering arms 44 and 45 extend rearwardly and are pivotally connected as at 46 and 47 with a tie rod 48 extending parallel with the rear axle. Preferably welded along the upper rear side of the rear axle 7 is a plate 49 having a plurality of apertures 50 for selectively connecting one end of a tie link 51 by a pull pin 52. The other end of the drag link is pivotally connected as at 53 with the tie rod 48 to preferably hold the rear wheels in a straightaway course.

Fixed to the end of the front axle 6 which carries the longest arch 8 is a plate 54 having a plurality of apertures 55 therein for connecting the tongue 56 of the foremost implement 3, the tongue 56 being connected by a coupling pin 57. The tongue 58 of the other implement 4 is connected with a plate 59 and which is supported by the rear axle on bars 60 which have their forward ends welded to the axle 7 and their rear ends welded to the plate 59. The plate 59 has apertures 61 for a coupling pin 62.

In FIG. 7 is shown a modification of the connection of the front tie rod 26 with the draftbar 30. In this form, the tie rod has plates 63 and 64 welded thereto in position to extend across the top of the part 35 of the draftbar 30, when the draftbar is connected to one or the other ends of the axle 6. The plates 63 and 64 each have a series of openings 65 and 66 for accommodating a pull pin 36 to connect the tie rod with the draftbar. Otherwise, the construction of the mobile hitch shown in FIG. 7 is the same as that illustrated in the other figures of the drawings. The advantage here is the elimination of the relatively long drag link 29.

In using the mobile hitch to pull two implements in tandem and in the line of draft, as when towing the implements along a highway, the tongues 56 and 58 of the implements 3 and 4 are connected by the coupling pins 57 and 62 to the plates 54 and 59 on the axles of the hitch. The pin 52 for fixing the drag link which controls the angles of the rear wheels 42 and 43 is removed, so that the wheels may swing freely. The part 35 of the draftbar 30 is connected to the plate 31 that is in line with the longer arch 8 of the frame 5. The drag link 29 is carried with the draftbar when the part 35 of the draftbar is connected to the plate 31 by the coupling pin 36. The yoke 40 of the draftbar is connected with the drawbar 39 of the tractor vehicle 2 by the coupling pin 41. On starting of the tractor vehicle from standing position, the pull of the drawbar 30 is on the end of the axle to which the implement 3 is connected, which causes the mobile hitch to swing with the arches 8 and 9 thereof passing over the implement 3. In making this swing, the front wheel 16, to which the pull is more closely applied, rolls ahead and the wheel 17 rolls to the rear. Since the rear wheels are free, they may roll in the direction that the rear ends of the arches 8 and 9 swing toward the line of draft, leading the tongue 58 of the second implement therewith until the longer arch 8 substantially coincides with the line of draft. Further forward progress of the tractor assures that the second implement has also moved into the line of draft (see FIG. 2). With the mobile hitch 1, implement 3 and implement 4, all aligned with the tractor vehicle 2, and with all wheels rolling in the same direction, the drag link 51 is again fixed to hold the course of the rear wheels 42 and 43 (see FIG. 2). In traveling position, it will be noted that the front and rear axles of the mobile hitch are at an angle to the direction of travel, but since the pulling points (coupling pins 57 and 62) of the implements are substantially in the line of draft, they will follow the tractor. Movement of the tractor vehicle to the right or left will produce a corresponding movement of the draftbar 30 to steer the wheels 16 and 17 through the drag link 29, connecting link 26, and steering arms 23—23 of the steering knuckles of the wheels 16 and 17, thereby steering the two implements 3 and 4 corresponding to movement of the tractor vehicle.

It is obvious that the width of the tow is substantially that of the width of the widest implement which brings the tow within the widths permissible for highway travel; if not, the coupling pins 36, 57 and 62 may be relocated in the plates 31, 54 and 59. However, the usual positions of the coupling pins that give the best relation of the implements in field position, as shown in FIG. 1, are near enough to the line of draft to be satisfactory when in traveling position.

Upon reaching a field of operation, the drawbar 39 of the tractor vehicle is uncoupled from the draftbar 30 by removing the coupling pin 41. The draftbar 30 is uncoupled from the plate 31 by removing the coupling pin 36. The draftbar is carried over to the opposite end of the front axle 6 and connected with the plate 32 by reinserting the coupling pin 36 into one of the openings 34. In moving the draftbar, the drag link 29 shifts therewith on the pivot 58 and now extends in the opposite direction along the link 26 (see FIG. 1). The drag link 51 is disconnected, to free the rear wheels 42 and 43. On backing the tractor vehicle up to the new position of the draftbar 30, the yoke 40 is recoupled to the drawbar 39.

Upon starting the tractor vehicle in a forward direction, the pull is on the end of the front axle 6 that is carried by the wheel 17, thereby pulling that side of the mobile hitch forwardly. The wheel at the other end of the axle 6 stands still, or it may roll backwardly. The frame 5 of the mobile hitch swings from over the implement 3 with the rear wheels 42 and 43 swinging and rolling in the same direction, to bring the tongue 58 of the implement 4 into staggered lateral relation with the front implement 3. On continued forward movement of the tractor vehicle, all of the wheels will straighten out in the same forward direction, whereupon the drag link 51 is resecured to the plate 49 and again fixes the rolling direction of the wheels 42 and 43.

The mobile hitch 1 and implements 3 and 4 are now in field operation position as shown in FIG. 1. It will be noted that the front axle is now angling in the opposite direction, and that the rear end has shifted over until the line of draft is substantially midway between the tongues 56 and 58 of the implements. The proper parallel spacing may be maintained for the particular implements by making adjustment of their tongue connections with the plates 54 and 59. Proper side draft may be attained by adjusting the coupling of the draftbar 30 with the plate 32 and adjustment of the connection of the drag link 51 on the plate 59. The latter adjustments affect the directional relationship of the front and rear wheels of the mobile hitch, to obtain any desired side draft that may be required to maintain the desired relation of the implements in field position. When proper adjustments are made, they are usually suitable for both traveling and field positions of the hitch and need not be changed.

From the foregoing, it will be obvious that the frame 5 and wheels 16–17 and 42–43 provide a mobile means generally triangular in shape to maintain stability, and that the upward arch of the frame accommodates shifting movement thereof over the first of the implements while trailing the second implement. It is also obvious that the tractor is connected with one and the other corners of the triangle which correspond with the ends of the front axle, while the second implement is connected with the apex of the triangle and the first implement is connected with the corner of the triangle joining the side of the longest length, which is the arch 8.

While we have illustrated and described the wheels as carried on the axles of steering knuckles, it is obvious that other means may be used for attaching the wheels to the frame of the hitch.

What we claim and desire to secure by Letters Patent is:

1. A mobile hitch for connecting a plurality of field implements with a tractor vehicle to be towed thereby in tandem for highway travel and in laterally spaced, staggered relation for field operation, said mobile hitch including
  a front axle,
  wheels carrying ends of the front axle,
  a generally triangular frame having the base thereof at the front and the apex at the rear,
  said frame having an upward arch between the front and rear wheels,
  means connected with one front corner of the frame for attaching the first of said implements,
  means connected with the apex of the frame for attaching a second implement,
  draft means for connection with the tractor vehicle,
  means at said one front corner for attaching the draft means to shift position of the triangular frame so that the arch thereof moves over the leading implement and substantially in line of draft with the tractor vehicle to lead the second implement in tandem relation with the first implement under pull of the tractor vehicle, and
  means on the opposite corner of the frame for connecting the draft means to shift the mobile hitch and bring said implements into field position upon pull of the tractor vehicle.

2. A mobile hitch for connecting a plurality of field implements with a tractor vehicle to be towed thereby in tandem for highway travel and in laterally spaced, staggered relation for field operation, said mobile hitch including
  a front axle,
  a triangular frame having the base thereof at the front and the apex to the rear,
  dirigible wheels carrying corners of the frame,
  said frame being arched upwardly between front and rear ends,
  means connected to one front corner of the frame for attaching the first of said implements,
  means connected with the apex of the frame for attaching a second implement,
  draft means for connection with the tractor vehicle,
  means for pivotally connecting the draft means with said one corner to cause said mobile hitch to shift position so that the arch thereof moves over the leading implement and substantially into line of draft with the tractor vehicle and lead the second implement into tandem relation with the first implement under pull of the tractor vehicle, and
  means at the opposite front corner of the frame for pivotally attaching the draft means to shift the mobile hitch and bring the said implements into field position upon pull of the tractor vehicle.

3. A mobile hitch for connecting a plurality of field implements with a tractor vehicle to be towed thereby in tandem for highway travel and in laterally spaced, staggered relation for field operation, said mobile hitch including
  a front axle,
  a triangular frame having the base thereof at the front and the apex to the rear,
  front and rear dirigible wheels carrying the front and rear corners of the frame,
  said frame being arched upwardly between said front and rear wheels,
  means connected to one front corner of the frame for attaching the first of said implements,
  means connected with the rear of the frame for attaching the following implement,
  draft means for connection with the tractor vehicle,
  means for connecting the draft means with said one corner to cause said mobile hitch to shift position so that the arch thereof is moved over the leading implement and substantially into line of draft with the tractor vehicle and lead the second implement into tandem relation with the first implement under pull of the tractor vehicle, and
  means at the opposite front corner of the frame for attaching the draft means in another position to shift the mobile hitch and bring the said implements into field position upon pull of the tractor vehicle.

4. A mobile frame as described in claim 3, and including
  a connection between the rear wheels and a fixed part of the frame for holding said rear wheels in a fixed direction in said two positions of the mobile hitch.

5. A mobile hitch for connecting a plurality of field implements with a tractor vehicle to be towed thereby in tandem for highway travel and in laterally spaced, staggered relation for field operation, said mobile hitch including
  a front axle,
  a generally triangular frame having the base thereof at the front and the apex to the rear,
  front and rear dirigible wheels carrying the front and rear corners of the frame,
  said frame being arched upwardly between front and rear wheels,
  means connected to one front corner of the frame for attaching the first of said implements,
  means connected with the apex corner of the frame for attaching the second implement,
  draft means for connection with the tractor vehicle,
  means for pivotally connecting the draft means with said one corner to cause said mobile hitch to shift position so that the arch thereof is moved over the leading implement and substantially into line of draft with the tractor vehicle and lead the second implement into tandem relation with the first implement under pull of the tractor vehicle,
  means at the opposite front corner of the frame for pivotally attaching the draft means to shift the mobile hitch and bring the said implements into field position upon pull of the tractor vehicle, and
  steering means connecting said front wheels to the draft means to be guided by the draft means.

6. A mobile hitch as described in claim 5, and including a connection of the rear wheels to a fixed part of the frame for holding said rear wheels in a fixed direction in said two positions of the mobile hitch.

7. A mobile hitch for connecting a plurality of field implements with a tractor vehicle to be towed thereby in tandem for highway travel and in laterally spaced, staggered relation for field operation, said mobile hitch including
  a front axle,
  a rear axle of relatively shorter length than the front axle,
  dirigible wheels carrying ends of said axles,
  arches of different length and each having front and rear legs, with the front legs being fixed to the front axle near the ends thereof with the arches converging rearwardly, and the rear legs being fixed to the rear axle to provide a generally triangular frame.
  means connected to the front axle near the connection of the front leg of the longer arch for pivotally connecting the first of said implements to the front axle, means connected with the rear axle for pivotally connecting the second implement, draft means for connection of the front axle of the mobile hitch with the tractor vehicle, means for connecting the draft means with the front axle near the end of the longer arch to cause said mobile hitch to shift position so that the longer arch is moved over the leading implement and substantially into line of draft with the tractor vehicle and lead the second implement into tandem relation with the first implement under pull of the tractor vehicle, and means on the opposite end of the front axle for connecting the draft means to shift the mobile hitch to bring the said implements into field position upon pull of the tractor vehicle.

8. A mobile hitch as described in claim 7, and which includes control means connecting the rear wheels with the rear axle for holding said wheels in a fixed direction in said two positions of the mobile hitch.

9. A mobile hitch as described in claim 7, and which includes steering means connecting the dirigible wheels of the front axle with the draft means to be steered thereby.

10. A mobile hitch as described in claim 7, and which includes steering means connecting the dirigible wheels of the front axle with the draft means, and side draft control means connecting the rear wheels with the rear axle for holding said rear wheels in a selected direction in said two positions of the mobile hitch.

11. A mobile hitch for connecting a plurality of field implements with a tractor vehicle to be towed thereby in tandem for highway travel and in laterally spaced, staggered relation for field operation, said mobile hitch including a front axle,
a rear axle of shorter length than the front axle,
dirigible wheels carrying ends of said axles,
arches of different length and each having front and rear legs with the front legs being fixed to near the ends of the front axle and the arches converging rearwardly and the rear legs fixed to the rear axle to provide a generally triangular frame,
steering arms for said wheels,
a link connecting the steering arms of the front wheels,
means connected to the front axle near the connection of the front leg of the longer arch for connecting the first of said implements,
means connected with the rear axle for attaching the second implement,
a draft bar for connection with the tractor vehicle,
means for pivotally connecting the draft bar with the front axle near the end of the longer arch to cause said mobile hitch to shift position so that the longer arch is moved over the leading implement and bringing the second implement in line with the longer arch and the longer arch in the line of draft,
means on the opposite end of the front axle for connecting the draft bar to shift the mobile hitch and bring the said implements into field position, and
means connecting the link with the draft bar in the said two positions thereof to steer the mobile hitch.

12. A mobile hitch as described in claim 11, in which the means connecting the link with the draft bar comprises apertured plates fixed to the link near the respective ends thereof, and a fastening device extending through a selected aperture of one and the other plates and an opening in the draft bar when the draft bar is in one and the other of its connected positions.

References Cited by the Examiner
UNITED STATES PATENTS

| | | | |
|---|---|---|---|
| 2,515,016 | 7/1950 | McClintock | 280—411 |
| 2,889,153 | 6/1959 | Kowalik | 280—412 X |
| 2,971,774 | 2/1961 | Bartel | 280—412 |
| 2,976,058 | 3/1961 | Sandgren | 280—413 |
| 3,008,732 | 11/1961 | Raney | 280—412 |
| 3,112,124 | 11/1963 | Bartel | 280—412 |

FOREIGN PATENTS 148,178   12/1954   Sweden.

LEO FRIAGLIA, *Primary Examiner.*